US012222462B2

(12) United States Patent
Peng et al.

(10) Patent No.: US 12,222,462 B2
(45) Date of Patent: Feb. 11, 2025

(54) METHOD FOR EVALUATING PROBABILITY OF ROAD COLLAPSE

(71) Applicant: Research Institute of Highway Ministry of Transport, Beijing (CN)

(72) Inventors: Lu Peng, Beijing (CN); Yu Tang, Beijing (CN); Xiaofan Feng, Beijing (CN); Guangwu Dou, Beijing (CN); Song He, Beijing (CN); Cili Gumu, Beijing (CN)

(73) Assignee: Research Institute of Highway Ministry of Transport, Beijing (CN)

( * ) Notice: Subject to any disclaimer, the term of this patent is extended or adjusted under 35 U.S.C. 154(b) by 0 days.

(21) Appl. No.: 18/669,210

(22) Filed: May 20, 2024

(65) Prior Publication Data
US 2024/0402385 A1  Dec. 5, 2024

(30) Foreign Application Priority Data

May 30, 2023 (CN) .......................... 202310619718.8

(51) Int. Cl.
*G01V 20/00* (2024.01)
(52) U.S. Cl.
CPC .................................. *G01V 20/00* (2024.01)
(58) Field of Classification Search
CPC ...................................................... G01V 20/00
See application file for complete search history.

(56) References Cited

FOREIGN PATENT DOCUMENTS

| CN | 110858334 A | | 3/2020 | |
| CN | 115081757 A | * | 9/2022 | ............ E01C 23/01 |
| CN | 115114700 A | * | 9/2022 | |
| WO | 2022126492 A1 | | 6/2022 | |

OTHER PUBLICATIONS

CN-110858334-A_translated (Year: 2020).*
CN-115081757-A_translated (Year: 2022).*
CN-115114700-A_translated (Year: 2022).*
First Examination Report and Search Report of CNIPA.
(Continued)

*Primary Examiner* — Natalie Huls
*Assistant Examiner* — Michael J Singletary

(57) ABSTRACT

A method for evaluating a probability of road collapse is provided, which includes: collecting road data information of the road to be analyzed, and obtaining road soil layer information and underground pipeline information respectively through the road data information; determining road soil layer deterioration factors based on the road soil layer information; constructing a deterioration factor influence intensity model combined with the road soil layer information to obtain the probability of the influence of the road soil layer deterioration factors; constructing an underground pipeline deterioration influence intensity model combined with the underground pipeline information to obtain the probability of the underground pipeline deterioration influence; summarizing the probability of the influence of the road soil layer deterioration factors and the probability of the underground pipeline deterioration influence, and then evaluating the probability of road collapse, improving the scientific nature and accuracy of the road collapse assessment process.

5 Claims, 4 Drawing Sheets

(56) References Cited

OTHER PUBLICATIONS

Notice of Allowance from CNIPA and Allowed Claims.
Jia Xiaobin, "Analyzing the Reason of Ground Collapse Disaster in Shenzhen" Journal of Catastrophology, 2016, 31(3): 114-118.
Chai Ai-hong, "Analysis on pavement collapsible causes and treatment points" Shanxi Architecture, May 1, 2013, pp. 149, vol. 39, No. 13, 2013.
Wang Xiaodong, "Development Plan of Safety Warning System for Urban Road Subsurface Hazardous Body" Coal Geology of China, Sep. 10, 2018, vol. 30, Sup.1, 2018.

* cited by examiner constructing corresponding the intensity model of the cavity influence factor, the intensity model of the seepage influence factor, and the intensity model of the non-soil layer impurity influence factor based on the cavity influence factor, the seepage influence factor, and the non-soil impurity influence factor; — S031 using the intensity model of the cavity influence factor, the intensity model of the seepage influence factor, and the intensity model of the non-soil layer impurity influence factor combined with the corresponding road soil layer information to obtain the intensity of the cavity influence factor, the intensity of the seepage influence factor, and the intensity of the non-soil layer impurity influence factor; — S032 obtaining the road standard bearing capacity of the road to be analyzed, and using the road standard bearing capacity combined with the intensity of the cavity influence factor, the intensity of the seepage influence factor, and the intensity of the non-soil layer impurity influence factor to obtain the probability of the influence of the road soil layer disease factors — S033

FIG. 2

METHOD FOR EVALUATING PROBABILITY OF ROAD COLLAPSE

CROSS-REFERENCE

This application claims to the benefit of priority from Chinese Application No. CN202310619718.8 with a filing date of May 30, 2023. The content of the aforementioned applications, including any intervening amendments thereto, are incorporated herein by reference.

TECHNICAL FIELD

The present disclosure relates to the technical field of transportation, in particular to a method for evaluating the probability of road collapse.

BACKGROUND

The safety and reliability of roads are crucial in urban transportation infrastructure. With the continuous expansion of road scale, many roads have entered the maintenance stage, and road collapse poses a huge threat to the human life and wealth security, as well as the smooth operation of road transportation networks.

However, existing road collapse assessment methods lack a unified failure probability value analysis that integrates multiple factors, and a single detection technique can only achieve detection for a single parameter. In addition, existing technologies also have the problem of scattered detection equipment for pavement structural deteriorations and intensity, which cannot form a systematic road bearing capacity assessment system. Therefore, there is an urgent need for a road collapse probability assessment method that comprehensively considers multiple factors affecting collapse, in order to improve the scientific and accurate process of road collapse assessment, and provide reference basis for many important projects such as road maintenance and condition assessment.

SUMMARY

In view of the shortcomings of existing technology and practical needs, in first aspect, the present disclosure provides a method for evaluating a probability of road collapse, aiming to improve the scientific nature and accuracy of the road collapse assessment process and provide reference basis for many important projects such as road maintenance and condition assessment. The method for evaluating the probability of road collapse includes the following steps: collecting road data information of the road to be analyzed, and obtaining road soil layer information and underground pipeline information respectively through the road data information; determining road soil layer deterioration factors of the road to be analyzed based on the road soil layer information; constructing a deterioration factor influence intensity model in combination with the road soil layer information to obtain the probability of the influence of the road soil layer deterioration factors; constructing an underground pipeline deterioration influence intensity model, and using the underground pipeline deterioration influence intensity model combined with the underground pipeline information to obtain the probability of the underground pipeline deterioration influence; summarizing the probability of the influence of the road soil layer deterioration factors and the probability of the influence of the underground pipeline deterioration, and then evaluating the probability of collapse of the road to be analyzed. The present disclosure comprehensively considers the two main factors of road soil layer and underground pipelines. By constructing an intensity model for the influence of deterioration factors and an intensity model for the deterioration of underground pipelines, an unified failure probability value analysis of multiple factors is achieved, which improves the accuracy and reliability of assessment. And a comprehensive data collection method is adopted, providing sufficient data support for the assessment. At the same time, based on the evaluation results, corresponding preventive measures can be taken in a timely manner to avoid road collapse incidents, thereby ensuring the human life and wealth security and the smooth operation of road transportation networks.

Optionally, collecting road data information of the road to be analyzed includes the following steps: using FWD to obtain pavement condition information of the road to be analyzed, wherein the pavement condition information includes a deflection value of the road to be analyzed; using GPR and/or EEM to obtain underground soil layer information of the road to be analyzed, wherein the underground soil layer information includes relative dielectric constant, electrical resistivity, and the underground structure condition. The present disclosure can comprehensively obtain the pavement condition information and underground soil layer information of the road to be analyzed through various testing methods such as FWD, GPR, EEM, etc., further improving the accuracy and reliability of the evaluation results. At the same time, these testing methods also have the advantages of non-invasive and efficient, which will not cause additional damage and impact to the analyzed road, and will not waste too much time and human resources.

Optionally, the road soil layer deterioration factors includes subterranean cavity influence factor, influence of seepage, and influence of non-soil impurities. The present disclosure considers the influence of different types of road soil layer deterioration factors on the probability of road collapse, and through subsequent analysis and assessment of different types of road soil layer deterioration factors, comprehensively evaluates the probability of road collapse, improving the accuracy and reliability of the assessment.

Optionally, constructing a deterioration factor influence intensity model, and using the deterioration factor influence intensity model combined with the road soil layer information to obtain the probability of the influence of the road soil layer deterioration factors, including the following steps: constructing corresponding the intensity model of the subterranean cavity influence factor, the intensity model of the seepage influence factor, and the intensity model of the non-soil layer impurity influence factor based on the subterranean cavity influence factor, the seepage influence factor, and the non-soil impurity influence factor; using the intensity model of the subterranean cavity influence factor, the intensity model of the seepage influence factor, and the intensity model of the non-soil layer impurity influence factor combined with the corresponding road soil layer information to obtain the intensity of subterranean cavity influence factor, the intensity of seepage influence factor, and the intensity of non-soil layer impurity influence factor; obtaining the road standard bearing capacity of the road to be analyzed, and using the road standard bearing capacity combined with the intensity of subterranean cavity influence factor, the intensity of seepage influence factor, and the intensity of non-soil layer impurity influence factor to obtain the probability of the influence of the road soil layer deterioration factors. The present disclosure ensures the accuracy and comprehensiveness of the probability assessment of the influence of road soil layer deterioration factors through comprehensively considering various road soil layer deterioration factors.

Optionally, the intensity model of the subterranean cavity influence factor, the intensity model of the seepage influence factor, and the intensity model of the non-soil layer impurity influence factor satisfy the following formulas:

$$\sigma_v = C_v \times E \times \frac{V_{unit}}{l_Z \times d \times \sqrt{2\pi}} \times e^{-\frac{x^2}{2d^2}} \times \left(\frac{x^2}{d^2} - 1\right),$$

$$\sigma_a = C_a \times (\gamma' Z_a \mp \gamma_a H_a), \; \sigma_e = \frac{C_e \times E \times \Delta Z_e}{D_e \times \xi_e \times (1-\mu)^2},$$

wherein, $\sigma_v$ represents an intensity of subterranean cavity influence, $C_v$ represents an empirical factor of deterioration of the subterranean cavity influence factor, E represents a modulus corresponding to a deflection of an area to be analyzed, $V_{unit}$ represents a volume of a subterranean cavity, d represents a width coefficient of the subterranean cavity, $l_Z$ represents a longitudinal distance between an axis of the subterranean cavity and a ground surface, x represents a lateral distance between a testing point of underground soil layer and the axis of the subterranean cavity; $\sigma_a$ represents an intensity of the seepage influence factor, $C_a$ represents an empirical factor of deterioration of seepage, $\gamma'$ represents a floating capacity of a seepage layer, $Z_a$ represents a distance between the seepage layer and the ground surface, $\gamma_a$ represents specific weight of water, $H_a$ represents a thickness of accumulated water in the seepage layer, $\sigma_e$ represents an intensity of the non-soil layer impurity influence factor, $C_e$ represents an empirical factor of deterioration of non-soil impurities, $\Delta Z_e$ represents a height difference of soil layer settlement around the non-soil impurities, $D_e$ represents a width of the soil layer settlement around non-soil impurities, $\xi_e$ represents the calculated length-width ratio parameter of non-soil impurities, μ represents the Poisson's ratio of soil layers around non-soil impurities, Optionally, the Probability of the Influence of Road Soil Deterioration Factors Satisfies the Following Formula:

$$P_{in} = \frac{\sigma_v + \sigma_a + \sigma_e}{[\sigma]},$$

wherein $P_{in}$ represents the probability of the influence of road soil deterioration factors, $\sigma_v$ represents the intensity of the subterranean cavity influence factor, $\sigma_a$ represents the intensity of the seepage influence factor, $\sigma_e$ represents the intensity of the non-soil layer impurity influence factor, and [σ] represents road standard bearing capacity;

Optionally, constructing an underground pipeline deterioration influence intensity model, and using the underground pipeline deterioration influence intensity model combined with the underground pipeline information to obtain the probability of the underground pipeline deterioration influence, including the following steps: constructing the underground pipeline deterioration influence intensity model based on the longitudinal force analysis of underground pipelines; using the underground pipeline deterioration influence intensity model combined with the underground pipeline information to obtain the intensity of the underground pipeline deterioration influence; obtaining the underground pipeline standard bearing capacity of the road to be analyzed, and using the underground pipeline standard bearing capacity combined with the intensity of the underground pipeline deterioration influence to obtain the probability of the underground pipeline deterioration influence.

Optionally, the underground pipeline deterioration influence intensity model satisfies the following formula:

$$Q = C_s \gamma_s Z_{pipe} d_{pipe} + C_s \gamma_s Z_{pipe} \cot \theta + 2 C_s \tau_s Z_{pipe} \csc \theta,$$

wherein, Q represents an intensity of the underground pipeline influence, $C_s$ represents an empirical factor of the underground pipeline deterioration influence, $\gamma_s$ represents specific weight of surrounding soil layer, $Z_{pipe}$ represents a distance between an upper surface of an underground pipeline and the ground surface, $d_{pipe}$ represents a diameter of the underground pipeline, θ represents a friction angle between the underground pipeline and the surrounding soil layer, $\tau_s$ represents undrained shear intensity of soil layers around the underground pipeline.

Optionally, the probability of the underground pipeline deterioration influence satisfies the following formula:

$$P_{out} = \frac{Q}{[Q]},$$

wherein, $P_{out}$ represents the probability of the underground pipeline deterioration influence, Q represents the intensity of the underground pipeline deterioration influence, and [Q] represents underground pipeline standard bearing capacity.

Optionally, the method for evaluating the probability of road collapse further includes the following steps: constructing an influence degree correction model, and using the influence degree correction model to correct the collapse probability of the road to be analyzed, wherein the corrected collapse probability satisfies the following formula:

$$P' = P_{in} + P_{out} + \Phi,$$

wherein, P' represents the corrected collapse probability, $P_{in}$ represents the probability of the influence of the road soil layer deterioration factors, $P_{out}$ represents the probability of the influence of the underground pipeline deterioration, and Φ represents the influence degree correction value. The present disclosure introduces an influence degree correction model, which comprehensively considers the influence degree of various factors and improves the accuracy of road collapse probability assessment.

The second aspect, in order to efficiently execute the road collapse assessment method provided by the present disclosure, the present disclosure further provides a road collapse probability assessment system, wherein the road collapse probability assessment system includes one or more processors; one or more input devices, one or more output devices, and memory, wherein the processor, the input device, the output device, and the memory are connected via a bus, and the memory is configured to store a computer program. The computer program includes program instructions, and the processor is configured to call the program instructions to execute the road collapse probability assessment method provided in the first aspect of the present disclosure. The road collapse probability assessment system provided by the present disclosure has a compact structure, stable performance, and can efficiently and accurately implement road collapse probability assessment methods.

BRIEF DESCRIPTION OF THE DRAWINGS

FIG. 2 is a flowchart of step S03 provided in an embodiment of the present disclosure;

DETAILED DESCRIPTION OF THE EMBODIMENTS

The specific embodiments of the present disclosure will be described in detail below. It should be noted that the embodiments described here are only for illustrative purposes and are not intended to limit the present disclosure. In the following description, a large number of specific details are elaborated to provide a thorough understanding of the present disclosure. However, it is obvious to ordinary skilled person in the art that these specific details do not need to be used to implement the present disclosure. In other examples, in order to avoid confusion with the present disclosure, there is no specific description of well-known circuits, software, or methods.

Throughout the entire specification, references to "one embodiment", "embodiment", "one example", or "example" imply that specific features, structures, or features described in conjunction with the embodiment or example are included in at least one embodiment of the present disclosure. Therefore, the phrases "in one embodiment", "in the present embodiment", "one example", or "example" that appear throughout the entire specification may not necessarily refer to the same embodiment or example. In addition, specific features, structures, or features can be combined in one or more embodiments or examples in any appropriate combination and/or sub combination. In addition, ordinary skilled person in the art should understand that the illustrations provided here are for illustrative purposes and may not necessarily be drawn to scale.

Figure 1:
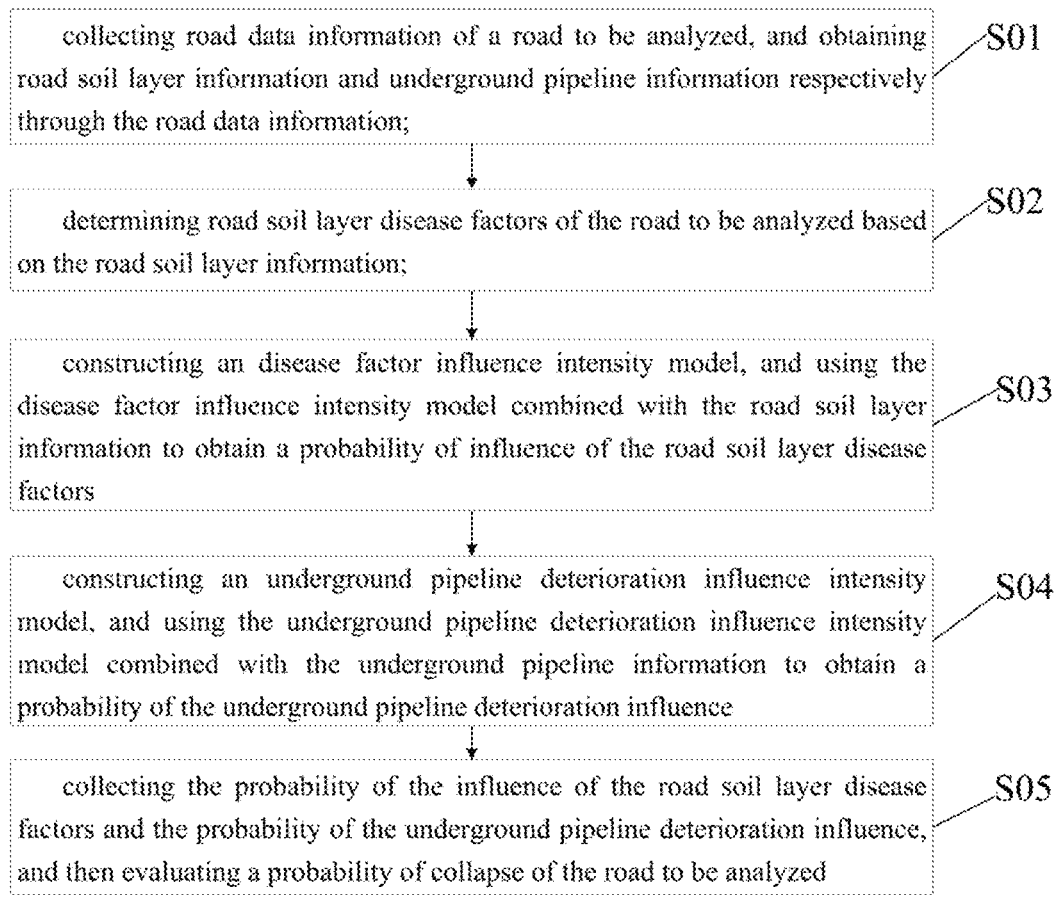
FIG. 1 is a flowchart of a method for evaluating a probability of road collapse provided in an embodiment of the present disclosure.

In an optional embodiment, please refer to FIG. 1, which is a flowchart of the road collapse probability assessment method provided in the embodiment of the present disclosure. As shown in FIG. 1, the probability assessment method for road collapse includes the following steps:

S01. Collecting road data information of a road to be analyzed, and obtaining road soil layer information and underground pipeline information respectively through the road data information.

The road to be analyzed in step S01 refers to the road area that requires performance deterioration assessment. Before evaluating the probability of road collapse, it is necessary to clarify the area range that needs to be evaluated. The following methods can be used to determine the road to be analyzed: first, conduct an overall survey and preliminary screening of the road, and select the area that require in-depth analysis as the road to be analyzed; or directly select the problematic road area as the road to be analyzed. Furthermore, the positioning of the road to be analyzed can be assisted by techniques such as GPS positioning, road maps, aerial images, etc., to quickly determine the position and range of the road to be analyzed.

Furthermore, the road data information described in step S01 includes the deflection value of the road to be analyzed, the relative dielectric constant of the underground medium, the electrical resistivity of the underground medium, and the underground structure condition. Wherein, the underground structure condition further includes images of underground pipelines.

The main purpose of obtaining road soil layer information and underground pipeline information through the road data information described in step S01 is to fill the subsequent model. Therefore, the specific classification of the road data information in step S01 can be adjusted according to subsequent needs. Due to the fact that the present disclosure mainly evaluates the probability of road collapse from the perspective of road soil layers and underground pipelines, the road data information is classified into road soil layer information and underground pipeline information. The road soil layer information includes the deflection value of the road to be analyzed, the relative dielectric constant of the underground medium, the electrical resistivity of the underground medium, and the underground structure condition; the underground pipeline information includes underground pipeline images.

Furthermore, collecting road data information of a road to be analyzed as described in step S01 includes the following steps:

S011. Using FWD to obtain the pavement condition information of the road to be analyzed, wherein the pavement condition information includes the deflection value of the road to be analyzed.

Wherein, FWD (Falling Weight Deflectometer) refers to a falling weight deflectometer. FWD is a device for detecting the bearing capacity of roadbed and pavement structures. It measures the instantaneous deformation of the roadbed or pavement surface under the impact load of a certain weight hammer falling at a certain height, that is, the dynamic deflection and deflection basin generated under dynamic load. The measured pavement settlement can be used for pavement structure assessment, calculation of the remaining life of the pavement, the bearing capacity, and the required thickness of the structural layer.

S012. Using GPR and/or EEM to obtain the underground soil layer information of the road to be analyzed, wherein the underground soil layer information includes relative dielectric constant, electrical resistivity, and the underground structure condition.

Wherein, GPR (Ground Penetrating Radar) refers to ground penetrating radar; EEM (Electromagnetic Exploration Method) refers to electromagnetic exploration methods. GPR is usually suitable for detecting shallow underground structures, with detection depths ranging from several meters to tens of meters, while EEM is suitable for detecting deeper underground structures, with detection depths reaching tens or even hundreds of meters. Therefore, information on shallower groundwater layers can be obtained using GPR, while information on deeper groundwater layers can be obtained using EEM.

The present disclosure can comprehensively obtain the pavement condition information and the underground soil layer information of the road to be analyzed through various testing methods such as FWD, GPR, EEM, etc., further improving the accuracy and reliability of the evaluation results. At the same time, these testing methods also have the advantages of non-invasive and efficient, which will not cause additional damage and impact to the analyzed road, and will not waste too much time and human resources.

S012. Determining road soil layer deterioration factors of the road to be analyzed based on the road soil layer information;

The road soil layer deterioration factors described in step S02 include a subterranean cavity influence factor, a seepage influence factor, and a non-soil layer impurity influence factor. The present disclosure considers the influence of different types of road soil layer deterioration factors on the probability of road collapse, and comprehensively evaluates the probability of road collapse through subsequent analysis and assessment of different types of road soil layer deterioration factors, improving the accuracy and reliability of the assessment.

Furthermore, the subterranean cavity influence factor refer to factors such as voids, cavities, and soil defects that appear within the soil layer. These factors can lead to the instability of the soil structure, affecting the bearing capacity and compressive performance of the soil layer. For example, during the construction process of underground engineering such as subways and underground pipelines, it may have an impact on the surrounding soil layer, forming voids. Meanwhile, in areas with complex geological structures, soil voids may also occur, such as in karst areas.

The seepage influence factor refer to the infiltration of groundwater into the interior of the soil layer through the cracks of the soil layer, resulting in loose soil structure and reduced compressive capacity, thereby affecting the service life and stability of the road. For example, water leaked during the construction process of underground pipelines, reservoirs, etc. can seep into the surrounding soil layers, causing damage to the soil structure and thus affecting road stability.

The non-soil layer impurity influence factor refer to the presence of non-soil impurities in the underground soil layer, such as pipelines, stones, metal minerals, etc. These impurities can have a negative impact on the intensity and stability of the soil layer. For example, when a groundwater pipeline passes through the soil layer of a road, the soil layer around the pipeline may be compacted or deformed by compression, thereby affecting the stability of the soil layer.

It should be understood that the subterranean cavity influence factor in step S02 can be reflected by the underground structure conditions in the road soil layer information. The seepage influence factor can be reflected based on the relative dielectric constant of the underground medium and the electrical resistivity of the underground medium; and the non-soil layer impurity influence factor can be reflected by relative dielectric constant, electrical resistivity, and underground structure conditions.

In this embodiment, it is possible to first determine whether there are voids or cracks around non-soil impurities based on the underground structure condition; then, based on the relative dielectric constant, the electrical resistivity, and the underground structure condition, determine the settlement situation around non-soil impurities; finally, determine whether there are influence factors of non-soil impurities based on the settlement conditions described. If settlement occurs, there are influence factors of non-soil impurities.

S03. Constructing a deterioration factor influence intensity model, and using the deterioration factor influence intensity model combined with the road soil layer information to obtain the probability of the influence of the road soil layer deterioration factors, In an optional embodiment, please refer to FIG. 2, which is a flowchart of step S03 provided in the embodiment of the present disclosure. As shown in FIG. 2, the step of constructing a deterioration factor influence intensity model, and using the deterioration factor influence intensity model combined with the road soil layer information to obtain the probability of the influence of the road soil layer deterioration factors as described in step S03 includes the following steps:

S031. Constructing corresponding the intensity model of the subterranean cavity influence factor, the intensity model of the seepage influence factor, and the intensity model of the non-soil layer impurity influence factor based on the subterranean cavity influence factor, the seepage influence factor, and the non-soil impurity influence factor.

In this embodiment, based on the subterranean cavity influence factor, the seepage influence factor, and the non-soil impurity influence factor, the intensity model of the subterranean cavity influence factor, the intensity model of the seepage influence factor, and the intensity model of the non-soil layer impurity influence factor are constructed, which respectively satisfy the following formulas:

$$\sigma_v = C_v \times E \times \frac{V_{unit}}{l_Z \times d \times \sqrt{2\pi}} \times e^{-\frac{x^2}{2d^2}} \times \left(\frac{x^2}{d^2} - 1\right),$$

$$\sigma_a = C_a \times (\gamma' Z_a \mp \gamma_a H_a), \sigma_e = \frac{C_e \times E \times \Delta Z_e}{D_e \times \xi_e \times (1 - \mu)^2},$$

Wherein, $\sigma_v$ represents an intensity of the subterranean cavity influence factor, $C_v$ represents an empirical factor of deterioration of subterranean cavity factor, E represents a modulus corresponding to a deflection of the area to be analyzed, $V_{unit}$ represents a volume of a subterranean cavity, d represents a width coefficient of the subterranean cavity, $l_Z$ represents a longitudinal distance between an axis of the subterranean cavity and a ground surface, x represents a lateral distance between a testing point of underground soil layer and the axis of the subterranean cavity; $\sigma_a$ represents an intensity of the seepage influence factor, $C_a$ represents an empirical factor of deterioration of seepage factor, $\gamma'$ represents a floating capacity of a seepage layer, $Z_a$ represents a distance between the seepage layer and the ground surface, $\gamma_a$ represents specific weight of water, $H_a$ represents a thickness of accumulated water in the seepage layer, $\sigma_e$ represents an intensity of the non-soil layer impurity influence factor, $C_e$ represents an empirical factor of deterioration of non-soil impurity factor, $\Delta Z_e$ represents a height difference of soil layer settlement around non-soil impurities, $D_e$ represents a width of the soil layer settlement around the non-soil impurities, $\xi_e$ represents the calculated length-width ratio parameter of the non-soil impurities, $\mu$ represents the Poisson's ratio of soil layers around the non-soil impurities. Wherein, after experimental verification and expert discussion, the value of $C_v$ is 0.2394, after experimental verification and expert discussion, the value of $C_a$ is 3.0872, and after experimental verification and expert discussion, the value of $C_e$ is 2.9784.

Furthermore, in an optional embodiment, the step of constructing corresponding the intensity model of the subterranean cavity influence factor includes the following steps:

S0311. Obtaining a subterranean cavity structure characterization model based on underground structure conditions. The subterranean cavity structure characterization model includes a subterranean cavity volume, a subterranean cavity width coefficient, a longitudinal distance from the subterranean cavity axis to the ground surface, and a lateral distance from the testing point of the underground soil layer to the subterranean cavity axis. The subterranean cavity structure characterization model satisfies the following formula:

$$S(x) = S_{max} \times e^{-\frac{x^2}{2d^2}} = \frac{V_{unit}}{\sqrt{2\pi d}} \times e^{-\frac{x^2}{2d^2}},$$

wherein S(x) represents the settlement value of the ground surface at position x, $S_{max}$ represents the maximum ground settlement, $V_{unit}$ represents the subterranean cavity volume, d represents the subterranean cavity width coefficient, and x represents the lateral distance from the testing point of the underground soil layer to the subterranean cavity axis.

S0312. Using the Peck formula combined with the subterranean cavity structure characterization model to obtain the strain component along the vertical direction of gravity on the surface of the road to be analyzed. The strain component satisfies the following formula:

$$\varepsilon_v = \frac{V_{unit}}{l_Z \times d \times \sqrt{2\pi}} \times e^{-\frac{x^2}{2d^2}} \times \left(\frac{x^2}{d^2} - 1\right),$$

wherein $\varepsilon_v$ represents the strain component along the vertical direction of gravity on the surface of the road to be analyzed, and $l_Z$ represents the longitudinal distance between the axis of the subterranean cavity and the ground surface.

S0313. Based on Hooke's law, the strain component is equivalent to the road surface settlement stress, and the road surface settlement stress is combined with the empirical factor of deterioration of subterranean cavity influence factor to obtain an intensity model of the subterranean cavity influence factor. The intensity model of the deterioration of the subterranean cavity influence factor satisfies the following formula:

$$\sigma_v = C_v \times E \times \frac{V_{unit}}{l_Z \times d \times \sqrt{2\pi}} \times e^{-\frac{x^2}{2d^2}} \times \left(\frac{x^2}{d^2} - 1\right),$$

wherein $\sigma_v$ represents the intensity of the subterranean cavity influence factor.

In this embodiment, the intensity model of the deterioration of subterranean cavity influence factor requires the cavitation size parameters, such as subterranean cavity volume, subterranean cavity width coefficient, etc., obtained through underground structure conditions collected by GPR and/or EMM. Using the Peck formula combined with underground structure conditions, the vertical and horizontal strain components of the ground surface along gravity are calculated. Due to the negligible influence of horizontal strain on the probability of ground collapse, only the vertical strain component along the gravity direction of the ground surface is selected for calculation. By obtaining the vertical strain component of the ground surface along the gravity direction, combined with the modulus corresponding to the deflection measured by FWD, the Hooke's Law is used to conduct stress equivalence of pavement settlement on the strain component. By combining the empirical factor of deterioration of the subterranean cavity influence factor, the intensity of deterioration of subterranean cavity influence factor can be calculated.

S032. Using the intensity model of the subterranean cavity influence factor, the intensity model of the seepage influence factor, and the intensity model of the non-soil layer impurity influence factor combined with the corresponding road soil layer information to obtain the intensity of the subterranean cavity influence factor, the intensity of the seepage influence factor, and the intensity of the non-soil layer impurity influence factor.

In this embodiment, a road with a long service life is selected for FWD and GPR testing. Based on the test results, the stability of the road is processed and analyzed, while being affected by factors such as cavities, seepage, and non-soil impurities.

Regarding the subterranean cavity influence factor, the corresponding road soil layer information (the modulus corresponding to the deflection of the area to be analyzed is −41.72, the volume of subterranean cavity is 0.002 cubic meters, the longitudinal distance from the axis of the subterranean cavity to the ground surface is 15.41 meters, the lateral distance from the testing point of the underground soil layer to the axis of the subterranean cavity is 0.01 meters, and the width coefficient of the subterranean cavity is 0.5 meters) is substituted into the intensity model of the subterranean cavity influence factor, and the current intensity of the subterranean cavity influence factor on the analyzed road is obtained:

$$\sigma_v = C_v \times E \times \frac{V_{unit}}{l_Z \times d \times \sqrt{2\pi}} \times e^{-\frac{x^2}{2d^2}} \times \left(\frac{x^2}{d^2} - 1\right) = 0.2394 \times (-41.72) \times$$

$$\frac{0.002}{15.41 \times 0.5 \times \sqrt{2\pi}} \times e^{-\frac{0.01^2}{2 \times 0.5^2}} \times \left(\frac{0.01^2}{0.5^2} - 1\right) = 1.034316 \text{ MPa}.$$

Regarding the seepage influence factor, the corresponding road soil layer information (the floating capacity of the seepage layer is 11 kN/m³, the specific weight of the water is 10 kN/m³, the distance between the seepage layer and the ground surface is 33.1 meters, and the thickness of the accumulated water in the seepage layer is 0.3 meters) is substituted into the above seepage influence factor intensity model to obtain the current influence intensity of the seepage influence factor on the analyzed road: $\sigma_a = C_a \times (\gamma' Z_a \mp \gamma_a H_a)$ =3.0872×(11000×33.1−10000×0.3)÷1000 MPa=1.114804 MPa. Seepage includes bottom-up seepage caused by underground pipeline leaks and top-down seepage caused by natural rainfall and other human factors (such as car washing, irrigation, etc.), so the direction of seepage is divided into top-down and bottom-up. Specifically, the influence intensity caused by bottom-up pipeline seepage and other reasons is calculated as a negative sign, while the influence intensity caused by top-down reasons such as rainfall is calculated as a positive sign. In this embodiment, due to the leakage caused by the pipeline, the direction is from bottom to top, so a negative sign is taken during calculation.

Regarding the non-soil layer impurity influence factor, in this embodiment, non-soil impurities refer to rigid pipelines buried underground, and their corresponding road soil layer information includes: settlement height difference of soil layer around non-soil impurities (0.13 meters), settlement height difference of soil layer around non-soil impurities (0.01 meters), calculated length-width ratio parameter of non-soil impurities (7), and Poisson's ratio of soil layer around non-soil impurities (0.43). The corresponding road soil layer information is substituted into the intensity model of the influence factor of non-soil layer impurities to obtain the intensity of the influence factor of non-soil layer impurities:

$$\sigma_e = \frac{C_e \times E \times \Delta Z_e}{D_e \times \xi_e \times (1-\mu)^2} = \frac{2.9784 \times 41.72 \times 0.13}{0.01 \times 7 \times (1-0.43)^2} = 0.904412 \text{ MPa}.$$

S033. Obtaining the road standard bearing capacity of the road to be analyzed, and using the road standard bearing capacity combined with the intensity of the subterranean cavity influence factor, the intensity of the seepage influence factor, and the intensity of the non-soil layer impurity influence factor to obtain the probability of the influence of the road soil layer deterioration factors.

In the present embodiment, the probability of the influence of road soil deterioration factors satisfies a following formula:

$$P_{in} = \frac{\sigma_v + \sigma_a + \sigma_e}{[\sigma]},$$

Wherein, $P_{in}$ represents the probability of the influence of road soil deterioration factors, $\sigma_v$ represents the intensity of subterranean cavity influence, $U_a$ represents the intensity of seepage influence, $\sigma_e$ represents the intensity of the influence of non-soil impurities, and $[\sigma]$ represents road standard bearing capacity. It should be understood that the road standard bearing capacity described in step S033 refers to the structural characteristics of the road itself.

Furthermore, the method of obtaining road standard bearing capacity includes consulting relevant specifications such as CJJ37-2012 (2016 edition) Code for design of urban road engineering. In this embodiment, the road standard bearing capacity is set to 4.5 MP. Therefore, in this embodiment, the probability of the influence of road soil layer deterioration factors on the road to be analyzed is:

$$P_{in} = \frac{\sigma_v + \sigma_a + \sigma_e}{[\sigma]} = \frac{1.034316 + 1.114804 + 0.904412}{4.5} = 0.678563.$$

The present disclosure ensures the accuracy and comprehensiveness of the probability assessment of the influence of road soil layer deterioration factors by comprehensively considering various road soil layer deterioration factors.

S04. Constructing an underground pipeline deterioration influence intensity model, and using the underground pipeline deterioration influence intensity model combined with the underground pipeline information to obtain a probability of the underground pipeline deterioration influence.

Figure 3:
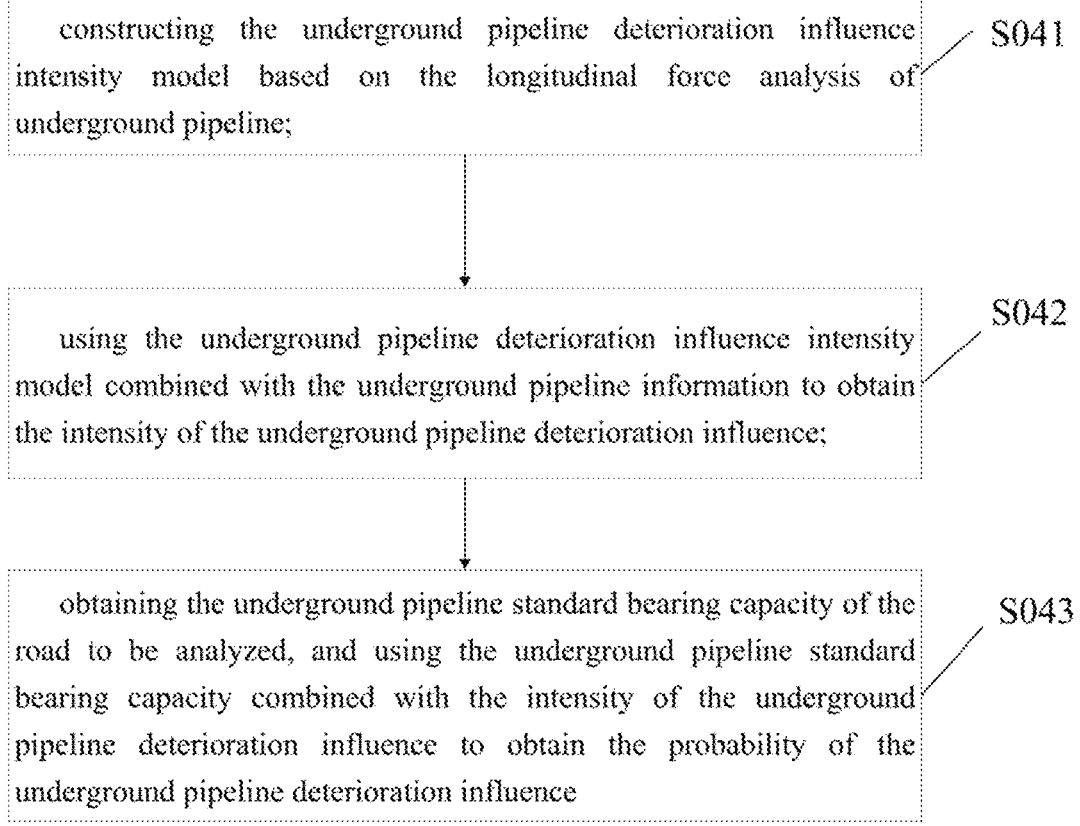
FIG. 3 is a flowchart of step S04 provided in an embodiment of the present disclosure.

In an optional embodiment, please refer to FIG. 3, which is a flowchart of step S04 provided in the embodiment of the present disclosure. As shown in FIG. 3, an underground pipeline deterioration influence intensity model is constructed, and the probability of the underground pipeline deterioration influence is obtained by combining the underground pipeline deterioration influence intensity model with the underground pipeline information, including the following steps:

S041. Constructing the underground pipeline deterioration influence intensity model based on the longitudinal force analysis of underground pipeline.

It should be understood that underground pipeline will deteriorate after long-term use. If the pressure borne by the pipeline exceeds its deteriorated bearing capacity, problems such as rupture, voids, and water seepage will occur, thereby affecting the strength of the road structure on the ground.

Furthermore, when the underground pipeline is subjected to soil load, the soil at the location of the underground pipeline will be subjected to external forces, resulting in corresponding stress and strain. Therefore, the intensity model of the deterioration effect of the underground pipeline is constructed based on the bearing capacity of the underground pipeline, mainly analyzing the longitudinal bearing capacity of the underground pipeline.

In the present embodiment, the underground pipeline deterioration influence intensity model satisfies the following formula:

$$Q = C_s \gamma_s Z_{pipe} d_{pipe} + C_s \gamma_s Z_{pipe} \cot \theta + 2C_s \tau_s Z_{pipe} \csc \theta;$$

Wherein, Q represents an intensity of the underground pipeline deterioration influence, $C_s$ represents an empirical factor of the underground pipeline deterioration influence, $\gamma_s$ represents specific weight of surrounding soil layer, $Z_{pipe}$ represents a distance between an upper surface of an underground pipeline and the ground surface, $d_{pipe}$ represents a diameter of the underground pipeline, $\theta$ represents a friction angle between the underground pipeline and the surrounding soil layer, $\tau_s$ represents undrained shear intensity of soil layers around the underground pipeline.

S042. Using the underground pipeline deterioration influence intensity model combined with the underground pipeline information to obtain the intensity of the underground pipeline deterioration influence.

In the present embodiment, the underground pipeline information includes: the specific weight of the soil layer around the underground pipeline is 18.53 kN/m³, the distance between the upper surface of the underground pipeline and the ground surface is 33.1 meters, the diameter of the underground pipeline is 0.45 meters, the friction angle between the underground pipeline and the surrounding soil layer is 85°, and the undrained shear strength of the soil layer around the underground pipeline is 24.13 kPa.

Furthermore, the above underground pipeline information is substituted into the underground pipeline deterioration influence intensity model to obtain the corresponding intensity of the underground pipeline deterioration influence:

$$Q = C_s \gamma_s Z_{pipe} d_{pipe} + C_s \gamma_s Z_{pipe}^2 \cot\theta + 2C_s \tau_s Z_{pipe} \csc\theta =$$
$$0.1735 \times 18530 \times 33.1 \times 0.45 + 0.1735 \times 18530 \times 33.1^2 \times \cot\frac{85° \pi}{180°} +$$
$$2 \times 0.1735 \times 24130 \times 33.1 \times \frac{85° \pi}{180°} \times \frac{1}{10^6} = 0.634522 \text{ MPa}.$$

S043. Obtaining the underground pipeline standard bearing capacity of the road to be analyzed, and using the underground pipeline standard bearing capacity combined with the intensity of the underground pipeline deterioration influence to obtain the probability of the underground pipeline deterioration influence.

In the present embodiment, the probability of the underground pipeline deterioration influence satisfies the following formula:

$$P_{out} = \frac{Q}{[Q]},$$

Wherein, $P_{out}$ represents the probability of the underground pipeline deterioration influence, Q represents the intensity of the underground pipeline deterioration influence, and [Q] represents underground pipeline standard bearing capacity.

Furthermore, the method of obtaining the underground pipeline standard bearing capacity includes consulting relevant specifications such as DB13 (J) T8340-2020 Design code of ductile iron pipelines for wastewater underground. In this embodiment, the standard bearing capacity of the underground pipeline is set to 3.6 MP. Therefore, in this embodiment, the probability of the influence of soil layer deterioration factors of the road to be analyzed is:

$$P_{out} = \frac{Q}{[Q]} = \frac{0.634522}{3.6} = 0.176256.$$

S05. Collecting the probability of the influence of the road soil layer deterioration factors and the probability of the influence of the underground pipeline deterioration, and then evaluating the probability of collapse of the road to be analyzed.

In an optional embodiment, the collapse probability of the road to be analyzed is obtained by adding the probability of the influence of the road soil layer deterioration factors and the probability of the underground pipeline deterioration influence, satisfying the following formula:

$$P = P_{in} + P_{out};$$

Wherein, P represents the probability of collapse, $P_{in}$ represents the probability of the influence of road soil layer deterioration factors, and $P_{out}$ represents the probability of underground pipeline deterioration influence. Furthermore, based on the above embodiments, the selected road to be analyzed has a collapse probability of:

$$P = P_{in} + P_{out} = 0.678563 + 0.176256 = 0.854819.$$

The actual situation of the selected road section in this embodiment can be seen from the probability of collapse: it has a large number of underground deteriorations, a long service time, and poor overall condition. If only traditional drop hammer deflectometer detection and ground penetrating radar detection are used, only a single or qualitative evaluation indicators can be obtained. However, through the probability calculation method of the present disclosure, not only can the results of integrating traditional detection methods be obtained, but also a scientific and unified probability assessment comprehensive indicators can be obtained. This not only reduces the complexity and unpredictability of road condition assessment work, increases the scientificity of road assessment, but also predicts the possibility of road collapse, effectively improving the level of road quality assessment and maintenance related work.

In the embodiments of the present disclosure, steps S01 to S05 comprehensively consider the two main factors of road soil layer and underground pipelines. By constructing an intensity model for the influence of deterioration factors and an intensity model for the deterioration of underground pipelines, a unified failure probability value analysis of multiple factors is achieved, which improves the accuracy and reliability of the assessment. In addition, a comprehensive data collection method is adopted, providing sufficient data support for the assessment. Based on the evaluation results, corresponding preventive measures can be taken in a timely manner to avoid road collapse incidents, thereby ensuring the human life and wealth security and the smooth operation of road transportation networks.

In an optional embodiment, to obtain more accurate road collapse probability assessment values, the road collapse probability assessment method provided by the present disclosure further includes the following steps:

S06. Constructing an influence degree correction model.

If the underground structure condition in the road data information described in step S01 is obtained by using GPR to obtain scanned images for 3D model construction, due to the fact that the irregular image boundaries in the scanned images are generally modeled as polygons surrounded by segmented straight lines when constructing the 3D model of underground pipelines, there is a certain error compared to reality.

In this embodiment, in order to eliminate the error, the constructed influence degree correction model satisfies the following formula: $\Phi = \pm c_u \Sigma \Delta S_i / \Sigma \Delta S_T$, wherein $\Phi$ represents the influence degree correction value, $C_u$ represents the empirical factor of the area calculation error influence, $\Delta S_i$ represents the area of the i-th shape enclosed by the modeling theoretical boundary and the scanned image boundary, and $\Delta S_T$ represents the total area of all shapes enclosed by the scanned image boundary.

Furthermore, the influence degree correction value obtained through the influence degree correction model in this embodiment is ±0.006197.

S07. using the influence degree correction model to correct the collapse probability of the road to be analyzed, wherein the corrected collapse probability satisfies the following formula:

$$P' = P_{in} + P_{out} + \Phi,$$

Wherein, P' represents the corrected collapse probability, $P_{in}$ represents the probability of the influence of the road soil layer deterioration factors, $P_{out}$ represents the probability of the influence of the underground pipeline deterioration, and $\Phi$ represents the influence degree correction value.

Furthermore, based on the collapse probability of the selected road to be analyzed in the above embodiments, the corrected collapse probability is: $P' = P_{in} + P_{out} \pm \Phi = 0.854819 \pm 0.006197$. The present disclosure introduces an influence degree correction model, which comprehensively considers the influence degree of various factors and improves the accuracy of road collapse probability assessment.

Figure 4:
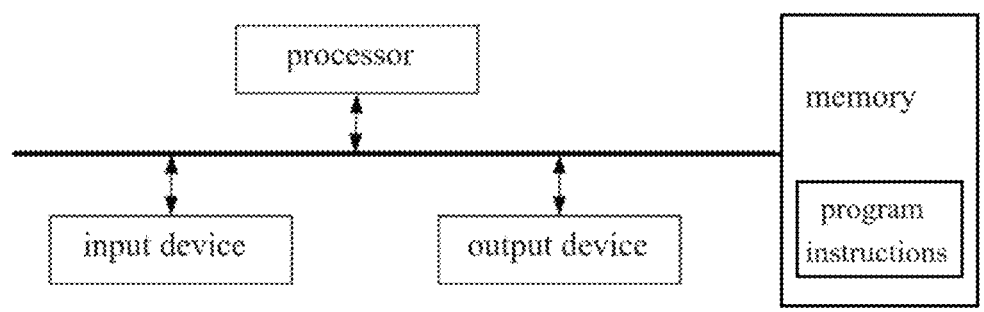
FIG. 4 shows the structural diagram of the road collapse probability assessment system provided in the embodiment of the present disclosure.

In an optional embodiment, to efficiently perform the road collapse probability assessment method provided by the present disclosure, the present disclosure further provides a road collapse probability assessment system. Please refer to FIG. 4, which is the structural diagram of the road collapse probability assessment system provided in the embodiment of the present disclosure. As shown in FIG. 4, the road collapse probability assessment system includes one or more processors; one or more input devices, one or more output devices, and memory, wherein the processor, the input device, the output device, and the memory are connected via a bus, and the memory is configured to store a computer program. The computer program includes program instructions, and the processor is configured to call the program instructions to execute the road collapse probability assessment method provided by the present disclosure. The road collapse probability assessment system provided by the present disclosure has a compact structure, stable performance, and can efficiently and accurately implement the road collapse probability assessment method.

In another optional embodiment, the processor 401 may be a central processing unit (CPU), other general-purpose processors, a digital signal processors (DSP), an application specific integrated circuit (ASIC), a field programmable gate array (FPGA) or other programmable logic devices, discrete gates or transistor logic devices, discrete hardware components, etc. The above-mentioned general-purpose processors can be microprocessors or any conventional processor. The input device 402 can be used to input road data information of the road to be analyzed. The output device 403 can display the evaluation results of road collapse probability obtained through the present disclosure. The memory 404 may include read-only memory and random access memory, and provide instructions and data to the processor 401. A portion of memory 404 may also include non-volatile random access memory. For example, memory 404 can also store information about device types.

Finally, it should be noted that the above embodiments are only used to illustrate the technical solution of the present disclosure, not to limit it. Although the present disclosure has been described in detail with reference to the aforementioned embodiments, those skilled in the art should understand that they can still modify the technical solutions recorded in the aforementioned embodiments, or equivalently replace some or all of the technical features. And these modifications or replacements do not make the essence of the corresponding technical solutions depart from the scope of the technical solutions of the various embodiments of the present disclosure, and they should all be covered within the scope of the claims and specifications of the present disclosure.

What is claimed is:

1. A method for evaluating a probability of road collapse, comprising following steps:
    collecting road data information of a road to be analyzed, and obtaining road soil layer information and underground pipeline information respectively through the road data information;
    positioning the road to be analyzed before collecting road data information of the road to be analyzed, and the positioning the road to be analyzed is assisted by techniques of GPS positioning, road maps, or aerial images to quickly determine a position and a range of the road to be analyzed;
    wherein collecting the road data information of the road to be analyzed comprises the following steps:
    using a falling weight deflectometer (FWD) to obtain pavement condition information of the road to be analyzed, wherein the pavement condition information comprises a deflection value of the road to be analyzed;
    using a ground penetrating radar (GPR) and/or an electromagnetic exploration method (EEM) to obtain underground soil layer information of the road to be analyzed, wherein the underground soil layer information comprises relative dielectric constant, electrical resistivity, and a condition of an underground structure: the underground structure condition includes images of underground pipelines: GPR is configured for detecting shallow underground structures, with detection depths ranging from several meters to tens of meters, while EEM is configured for detecting deeper underground structures, with detection depths reaching tens or even hundreds of meters;
    determining road soil layer deterioration factors of the road to be analyzed based on the road soil layer information;
    constructing a deterioration factor influence intensity model, and using the deterioration factor influence intensity model combined with the road soil layer information to obtain a probability of influence of the road soil layer deterioration factors, wherein the deterioration factor influence intensity model comprises an intensity model of a subterranean cavity influence factor, an intensity model of a seepage influence factor, and an intensity model of a non-soil layer impurity influence factor; the intensity model of the subterranean cavity influence factor, the intensity model of the seepage influence factor, and the intensity model of the non-soil layer impurity influence factor satisfy the following formulas:

$$\sigma_v = C_v \times E \times \frac{V_{unit}}{I_Z \times d \times \sqrt{2\pi}} \times e^{-\frac{x^2}{2d^2}} \times \left(\frac{x^2}{d^2} - 1\right),$$

$$\sigma_a = C_a \times (\gamma' Z_a \mp \gamma_a H_a), \sigma_e = \frac{C_e \times E \times \Delta Z_e}{D_e \times \xi_e \times (1-\mu)^2},$$

wherein, $\sigma_v$ represents an intensity of the subterranean cavity influence factor, $C_v$ represents an empirical factor of deterioration of subterranean cavity factor, E represents the modulus corresponding to a deflection of an area to be analyzed, $V_{unit}$ represents a volume of a subterranean cavity, d represents a width coefficient of the subterranean cavity, $l_Z$ represents a longitudinal distance between an axis of the subterranean cavity and a ground surface, x represents a lateral distance between a testing point of underground soil layer and the axis of the subterranean cavity; $\sigma_a$ represents an intensity of the seepage influence factor, $C_a$ represents an empirical factor of deterioration of seepage factor, $\gamma'$ represents a floating capacity of a seepage layer, $Z_a$ represents a distance between the seepage layer and the ground surface, $\gamma_a$ represents specific weight of water, $H_a$ represents a thickness of accumulated water in the seepage layer, $\sigma_e$ represents an intensity of the non-soil layer impurity influence factor, $C_e$ represents an empirical factor of deterioration of non-soil impurity factor, $\Delta Z_e$ represents a height difference of soil layer settlement around the non-soil impurities, $D_e$ represents a width of the soil layer settlement around non-soil impurities, $\xi_e$ represents the calculated length-width ratio parameter of non-soil impurities, $\mu$ represents the Poisson's ratio of soil layers around non-soil impurities, the probability of the influence of the road soil layer deterioration factors satisfies a following formula:

$$P_{in} = \frac{\sigma_v + \sigma_a + \sigma_e}{[\sigma]},$$

wherein $P_{in}$ represents the probability of the influence of the road soil layer deterioration factors, $\sigma_v$ represents the intensity of the subterranean cavity influence factor, $\sigma_a$ represents the intensity of the seepage influence factor, $\sigma_e$ represents the intensity of the non-soil layer impurity influence factor, and $[\sigma]$ represents road standard bearing capacity;
    constructing an underground pipeline deterioration influence intensity model, and using the underground pipeline deterioration influence intensity model combined with the underground pipeline information to obtain a probability of the underground pipeline deterioration influence, wherein the underground pipeline deterioration influence intensity model satisfies the following formula: $Q=C_s\gamma_s Z_{pipe} d_{pipe}+C_s\gamma_s Z_{pipe}^2 \cot\theta+2C_s\tau_s Z_{pipe}\csc\theta$, wherein Q represents an intensity of the underground pipeline deterioration influence, $C_s$ represents an empirical factor of the underground pipeline deterioration influence, $\gamma s$ represents specific weight of surrounding soil layer, $Z_{pipe}$ represents a distance between an upper surface of an underground pipeline and the ground surface, $d_{pipe}$ represents a diameter of the underground pipeline, $\theta$ represents a friction angle between the underground pipeline and the surrounding soil layer, $\tau_s$ represents undrained shear intensity of soil layers around the underground pipeline; the probability of the underground pipeline deterioration influence satisfies the following formula:

$$P_{out} = \frac{Q}{[Q]},$$

wherein $P_{out}$ represents the probability of the underground pipeline deterioration influence, Q represents the intensity of the underground pipeline deterioration influence, and [Q] represents underground pipeline standard bearing capacity;
  summarizing the probability of the influence of the road soil layer deterioration factors and the probability of the underground pipeline deterioration influence, and then evaluating a probability of collapse of the road to be analyzed.

2. The method for evaluating the probability of road collapse according to claim 1, wherein the road soil layer deterioration factors comprise the subterranean cavity influence factor, the seepage influence factor, and the non-soil layer impurity influence factor.

3. The method for evaluating the probability of road collapse according to claim 2, wherein constructing the deterioration factor influence intensity model, and using the deterioration factor influence intensity model combined with the road soil layer information to obtain the probability of the influence of the road soil layer deterioration factors, comprising following steps:
  constructing corresponding the intensity model of the subterranean cavity influence factor, the intensity model of the seepage influence factor, and the intensity model of the non-soil layer impurity influence factor based on the subterranean cavity influence factor, the seepage influence factor, and the non-soil impurity influence factor;
  using the intensity model of the subterranean cavity influence factor, the intensity model of the seepage influence factor, and the intensity model of the non-soil layer impurity influence factor combined with the corresponding road soil layer information to obtain the intensity of the subterranean cavity influence factor, the intensity of the seepage influence factor, and the intensity of the non-soil layer impurity influence factor;
  obtaining the road standard bearing capacity of the road to be analyzed, and using the road standard bearing capacity combined with the intensity of the subterranean cavity influence factor, the intensity of the seepage influence factor, and the intensity of the non-soil layer impurity influence factor to obtain the probability of the influence of the road soil layer deterioration factors.

4. The method for evaluating the probability of road collapse according to claim 1, wherein constructing an underground pipeline deterioration influence intensity model, and using the underground pipeline deterioration influence intensity model combined with the underground pipeline information to obtain the probability of the underground pipeline deterioration influence, comprising following steps:
  constructing the underground pipeline deterioration influence intensity model based on the longitudinal force analysis of underground pipeline;
  using the underground pipeline deterioration influence intensity model combined with the underground pipeline information to obtain the intensity of the underground pipeline deterioration influence;
  obtaining the underground pipeline standard bearing capacity of the road to be analyzed, and using the underground pipeline standard bearing capacity combined with the intensity of the underground pipeline deterioration influence to obtain the probability of the underground pipeline deterioration influence.

5. The method for evaluating the probability of road collapse according to claim 1, further comprises following steps:
  constructing an influence degree correction model, and using the influence degree correction model to correct the collapse probability of the road to be analyzed, wherein a corrected collapse probability satisfies the following formula:

$$P'=P_{in}+P_{out}+\Phi,$$

wherein, P' represents the corrected collapse probability, $P_{in}$ represents the probability of the influence of the road soil layer deterioration factors, $P_{out}$ represents the probability of the underground pipeline deterioration influence, and $\Phi$ represents the influence degree correction value.

* * * * *